United States Patent [19]
Ito et al.

[11] Patent Number: 5,620,228
[45] Date of Patent: Apr. 15, 1997

[54] DRAWER DEVICE

[75] Inventors: Kuniyasu Ito; Shigeru Yabuya; Minoru Shibata; Akira Azumi, all of Aichi-Pre., Japan

[73] Assignee: Toyoda Gosei Co., Ltd., Nishikasugai-ken, Japan

[21] Appl. No.: 496,905

[22] Filed: Jun. 29, 1995

[30] Foreign Application Priority Data

Jul. 1, 1994 [JP] Japan ...................... 6-150812

[51] Int. Cl.⁶ ...................... A47C 7/62
[52] U.S. Cl. ............... 297/188.17; 297/113; 248/311.2; 312/333
[58] Field of Search .................. 297/188.17, 113, 297/115, 188.04, 188.16, 188.15, 188.14; 312/333, 334.13, 235.6; 224/42.45; 248/311.2

[56] References Cited

U.S. PATENT DOCUMENTS

| | | | |
|---|---|---|---|
| 4,595,993 | 6/1986 | Yao | 312/333 X |
| 4,632,248 | 12/1986 | Hsu | 312/333 X |
| 5,171,075 | 12/1992 | Nagano et al. | |
| 5,228,611 | 7/1993 | Yabuya | |
| 5,284,314 | 2/1994 | Misaras et al. | 297/188.17 X |
| 5,449,105 | 9/1995 | Schiff et al. | 297/188.17 X |

FOREIGN PATENT DOCUMENTS

| | | | |
|---|---|---|---|
| 518358 | 12/1992 | European Pat. Off. | 297/113 |
| 1-170036 | 11/1989 | Japan . | |

*Primary Examiner*—Laurie K. Cranmer
*Attorney, Agent, or Firm*—Cushman Darby & Cushman IP Group Of Pillsbury Madison & Sutro LLP

[57] ABSTRACT

A drawer device or member is provided which is prevented from inadvertently moving of an arm rest at the time of either a sudden stop or very fast acceleration when starting. The drawer device comprises an outer member fixed in the arm rest and an inner member installed so as to be capable of sliding movement into and out of the outer member. A push type lock or open mechanism is positioned between the outer member and the inner member, and regulates movement of the inner member. Also included is a control device, which controls movement of the inner member by preventing release of the lock when the arm rest is in a substantially upright position, and releases the lock when the arm is in a substantially horizontal position.

4 Claims, 3 Drawing Sheets

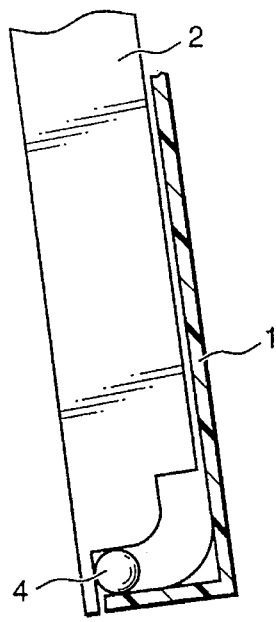
Fig. 5
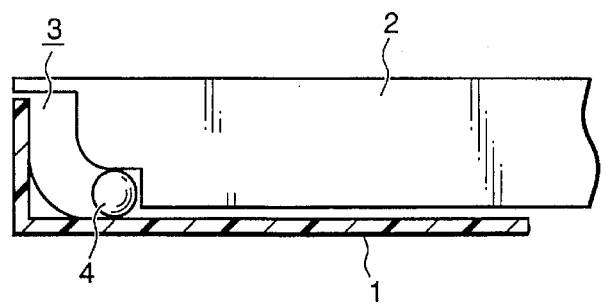
Fig. 6
Fig. 7
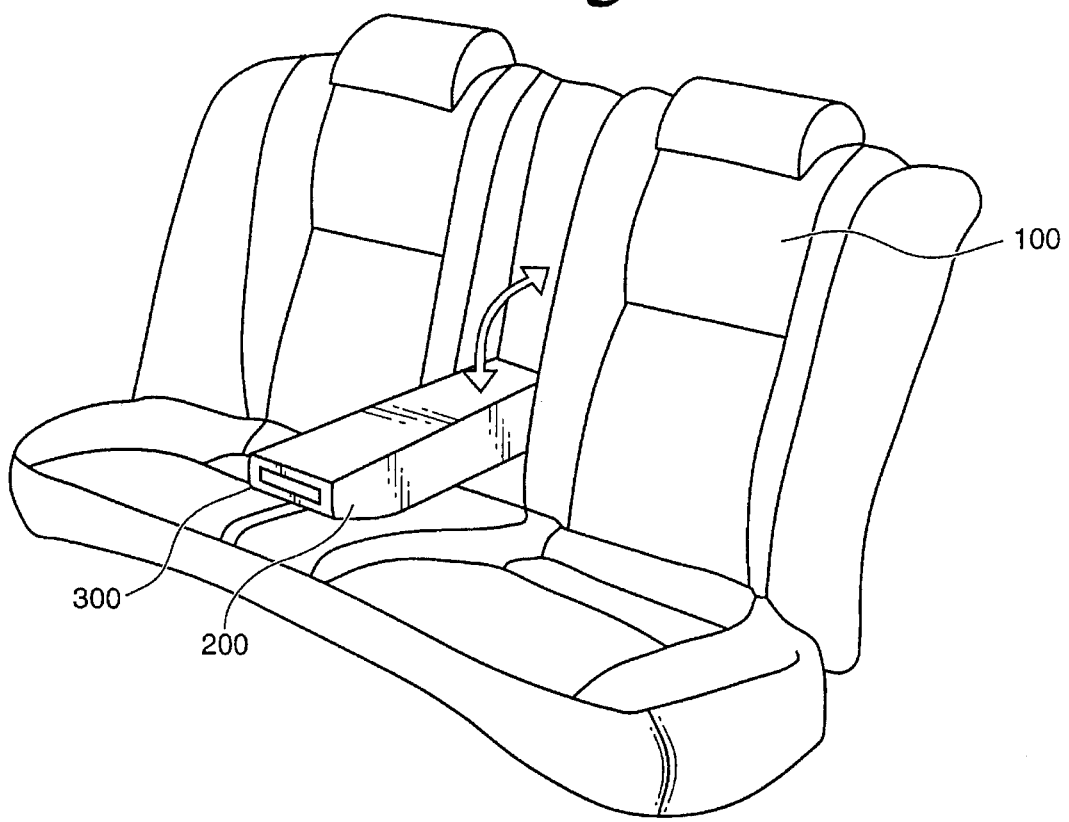

DRAWER DEVICE

BACKGROUND OF THE INVENTION

1. Field of the invention

The present invention relates to a drawer device, and more particularly to a drawer device provided in a rear seat arm rest, and moves in an inward and outward direction.

2. Description of the Related Art

A conventional cup holder drawer device is described in the non-examined Japanese Utility Model No. Hei 1-170036. That drawer device is provided in an instrumental panel, and has a spring that biases the drawer outwardly from the interior. When the push-lock-open system is released, the drawer device appears automatically due to spring force.

Generally, drawer device can also be provided in console box or the back side of the front seat. However, in order to make the most use of the vehicle's interior space, cup holder drawer can be provided in the arm rest of rear seat. The arm rest is pivotally mounted in the seat back of the rear seat, and moves freely between a horizontal use position and a vertical storage position.

However, when a vehicle suddenly stops, the force may be sufficient to move the arm rest out into a horizontal position. Also, when a cup holder drawer is slidably provided in the arm rest, the drawer may come out from the arm rest, even if locked with a push-lock-open type mechanism.

SUMMARY OF THE INVENTION

It is an object of the present invention to provide a drawer device which is prevented from inadvertently opening.

To achieve the foregoing object, the drawer device is provided in an arm rest which is pivotally mounted in the seat back of a rear seat. The arm rest is substantially in an upright position when stored in the back seat, and is substantially in a horizontal position when being used. The arm rest, however, includes an outer member fixed therein with an opening at the free end thereof. Also included is an inner member, which is installed so as to be capable of movement into and out of the outer member in substantially the horizontal position. A push-lock-open mechanism is provided between the inner and outer member and regulates movement of the inner member. Finally, a control device, placed between the inner and outer member, controls movement of the inner member so as to not release the push type lock or opening mechanism in case of non-use, yet release that lock to permit use.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWING

FIG. 5 is a cross-sectional view of a second embodiment of a control device of the drawer device substantially in an upright position in accordance with the present invention;

FIG. 6 is a cross-sectional view of the second embodiment of a control device in a horizontal position; and FIG. 7 is a perspective view of a rear seat of an automobile.

DETAILED DESCRIPTION OF THE PREFERRED EMBODIMENTS

FIGS. 1 to 4 and 7 illustrate a first embodiment of the present invention, which will be described in detail hereinafter.

As shown in FIG. 7, a cup holder 300 is provided in an arm rest 200 of the seat back 100. The arm rest 200 is pivotally mounted in the seat back 100 of the rear seat in a conventional manner.

Figure 1:
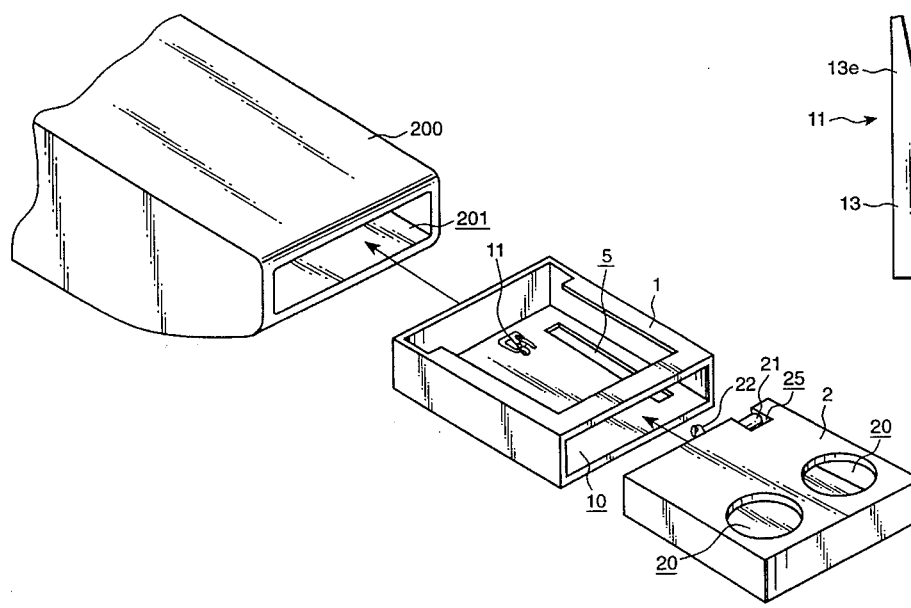
FIG. 1 is a perspective view of a drawer device in accordance With the present invention.

As shown in FIG. 1, the cup holder 300 comprises an outer member 1 and an inner member 2. The outer member 1 is substantially box-shaped, and is inserted into an opening 201 formed in the front portion of the arm rest 200.

The outer member 1 is fixed to the arm rest by a conventional fastener (not illustrated). The outer member 1 includes an opening 10 at one end, which is preferably aligned with opening 201 when not in use. Member 1 also includes a cam unit 11, which is positioned on an interior bottom 14 thereof, and a guide hole 5 which is also formed in bottom 14. The outer member 1 further includes a push-lock-open type mechanism, which comprises the cam unit 11 and an arm 22 shown in FIG. 2.

The inner member 2 also is substantially box-shaped, and is installed by being slid into opening 10 of outer member 1 so as to be capable of movement into and out of the outer member 1 substantially in the horizontal position. The inner member 2 includes two circular holes 20 juxtaposed in the forward portion of the top wall 15 surface, a hollow portion 25 at the rear side thereof, and a free swinging pendulum 21 which acts as a control device and is provided in the hollow portion 25. The inner member 2 also includes an arm 22, which moves freely, a pin 23 provided at the tip of arm 22, and a projection (not illustrated), which slides in the guide hole 5, at the back side of the bottom 14. The inner member 2 is biassed outwardly by a spring (not illustrated) from the opening of the outer member 1.

The cam unit 11 comprises a heart cam 12 and a rail portion 13, which surrounds the heart cam 12 on three sides. The heart cam 12 has a notch 12a and a slope 12b. The rail portion 13 includes a projection 13b having a slope 13a, which is opposed to the notch 12a, a first groove 13c and a second groove 13d, which is provided on both side of the projection 13b, and a first rail 13e and a second rail 13f, which extend on both sides of the heart cam 12 in the horizontal position of the inner member 2. The first groove 13c lies opposed to the notch 12a, and the second groove 13d is positioned opposed to a space between the heart cam 12 and the second rail 13f. The second rail 13f has a protruding portion 13g which extends toward arm 22 at the free end thereof.

Figure 2:
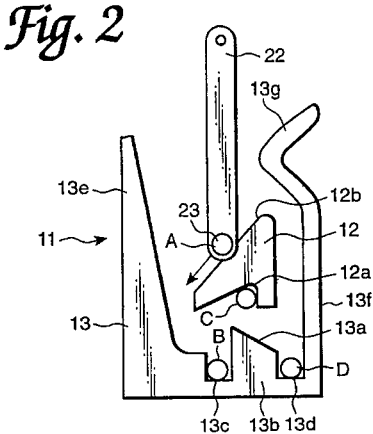
FIG. 2 is an enlarged top view of a push type lock or opening mechanism in accordance with the present invention.

When the inner member 2 is placed in the outer member 1, the inner member 2 is pushed inwardly of the outer member 1 so that the pin 23 contacts slope 12b (point A in FIG. 2). Further inward movement moves the pin 23 along the slope 12b in the direction as shown by the arrow. Then, the pin 23 slides off the heart cam 12 and pin 23 is then steered by the first rail 13e, and movement of the inner member 2 is restricted in the first groove 13c (point B). In the event that the pin 23 is in the opposite position of the second groove 13d, because of swing of the arm 22, the pin 23 is attached to the protrudent portion 13g so that the arm 22 sways, and the pin 23 is contacted to the slope 12b.

Figure 4:
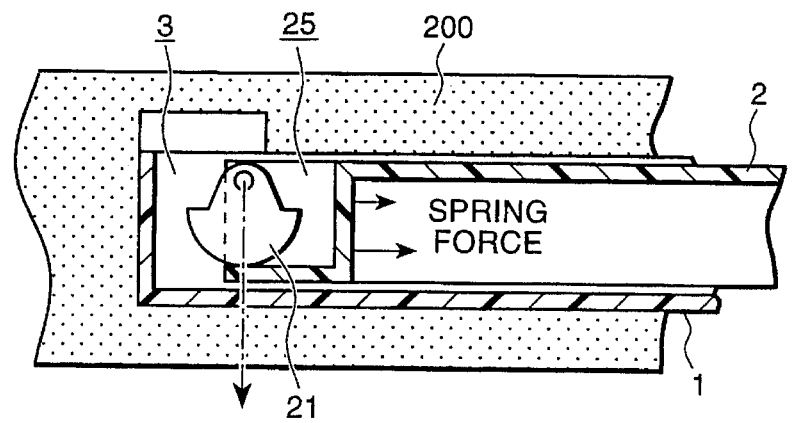
FIG. 4 is a cross-sectional view of the first embodiment of a control device in a horizontal position.

When the inner member 2 is released at the point B, the inner member 2 moves in the outward direction from the opening 10 by biasing force of a spring illustrated by the arrow in FIG. 4 applied to wall 7. Then the pin 23 and the notch 12a are interlocked with each other (point C) so that movement of the inner member 2 is controlled and the inner member 2 is in its normally closed position.

When use of the cup holder is desired, the front end of the inner member 2 is pushed inwardly by finger toward the outer member 1 such that the combination of the pin 23 and the groove 12a are released from the locked state. The pin 23 is steered along the slope 13a, and then positioned in the second groove 13d (point D). In this point, movement of the inner member 2 is still controlled. When the inner member 2 is released at the point D, member 2 moves in an outward direction from the opening 10 by biasing force of a spring shown by the arrow in FIG. 4. The pin 23 passes the space between the heart cam 12 and the second rail 13f so that the inner member 2 is automatically pulled out of the outer member 1 so that the inner member 2 is then in its pulled-out or opened position.

As the inner member 2 is pulled out of the outer member 1, a guide lug (not illustrated) of the inner member 2, which projects from the back side thereof, is guided by the guide hole 12 of the outer member 1. Because the guide hole 12 defines the in/out movement length of the inner member 2, the inner member 2 will not move in excess of the length of the outer member 1.

When opening forces applied to a locked inner member 2 are accelerated or generated due to forces associated with a sudden stop so that a force component is transferred so as to push the inner member 2 into the outer member 1, pin 23 can move out of notch 12a, and move from the point C to the point D. As the result of such movement, the pin 23 and the heart cam 12 are released from their locked state.

Figure 3:
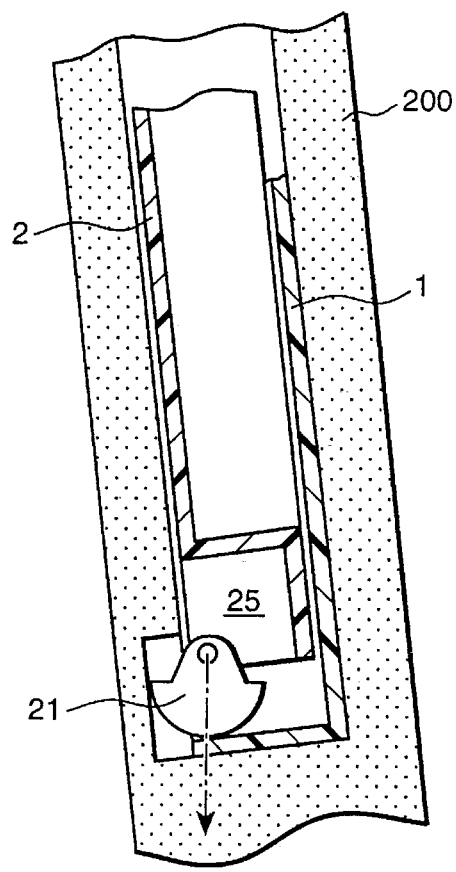
FIG. 3 is a cross-sectional view of a first embodiment of a control device of the drawer device substantially in an upright position in accordance with the present invention.

In this embodiment, a pendulum 21 is pivotally mounted at the rear side of the inner member 2 to prevent the lock from releasing. FIG. 3 shows a cross-sectional view of the arm rest 200 substantially in upright position, and the inner member 2 is in the locked state. In this state, the pendulum 21 swings by gravity so that it contacts the rear side interior surface of the outer member 1. Accordingly, the pendulum 21 can control the movement to push the inner member 2 into the outer member 1 so as not to release the lock.

As can be seen in FIG. 4, when the arm rest 200 is substantially in horizontal position, the pendulum 21 swings by gravity, and enters the hollow portion 25 of the inner member 2. Accordingly, the pendulum 21 makes a space 3 between the rear side interior surface of the outer member 1, so that the inner member 2 can then move into the outer member, and can release the lock.

FIGS. 5 and 6 illustrate a second embodiment of the present invention where a ball 4 is used instead of the pendulum 21 of the first embodiment. Other components are same as the first embodiment. The ball 4 can move freely between the rear portion of the inner member 2 and the outer member 1. When the arm rest 200 is substantially in the upright position, the ball 4 moves, and is positioned between the rear side outer surface of the inner member 2 and the rear side inner surface of the outer member 1. Consequently, the position of ball 4 controls an attempt to push the inner member 2 further into the outer member 1 so as not to release the lock.

When the arm rest 200 is substantially in the horizontal position, the ball 4 moves, and makes a space between the inner member 2 and the outer member 1. As the result of this construction, the inner member 2 can then move into the outer member, and can release the lock.

As seen from the foregoing description, the drawer device of the present invention can prevent the lock from releasing in case of sudden stop so that the inner member 2 can be kept from coming out of the arm rest 200 without pushing by finger or the like.

While the invention has been described in connection with what is presently considered to be the most practical and preferred embodiment, it is to be understood that the invention is not to be limited to the disclosed embodiment, but on the contrary, is intended to cover various modification and equivalent arrangements included within the spirit and scope of the appended claims.

What is claimed is:

1. A drawer device for an automobile comprising:

an arm member pivotally mounted to said automobile to be movable between upright and horizontal positions, said arm member having a free end;

a drawer member slidably mounted within said arm member to move outwardly from said free end, said drawer member being movable between a pulled open position, a first interior position, and a second interior position;

a spring member biasing said drawer member toward said pulled open position;

a lock mechanism that is engaged to lock said drawer member in said first interior position, said locking mechanism including means for releasing the lock as said drawer member is moved from said first interior position to said second interior position, and locking said drawer member as said drawer member is pushed from said pulled open position to said second interior position; and a control member positioned between said arm member and said drawer member, said control member preventing said drawer member from being pushed between said first and second interior positions when said arm member is in a substantially upright position, said control member allowing said drawer member to be pushed between said first and second interior positions when said arm member is pivoted out of said upright position.

2. A drawer device according to claim 1, wherein said arm member has a box-like outer case and said drawer device is provided in said outer case.

3. A drawer device according to claim 1, wherein said control member comprises a free swinging pendulum positioned between said arm member and said drawer device.

4. A drawer device according to claim 1, wherein said control member is a ball which is positioned to move freely in a space between said arm member and said drawer device, and prevents movement of said drawer device when said arm member is in a substantially upright position.

* * * * *